United States Patent [19]

Morduchowitz et al.

[11] 3,897,353

[45] July 29, 1975

[54] METHOD OF PREVENTING HAZE IN OIL CONCENTRATES CONTAINING AN AMORPHOUS ETHYLENE-PROPYLENE COPOLYMER VISCOSITY INDEX IMPROVER

[75] Inventors: Abraham Morduchowitz, Monsey; James G. Dadura, Fishkill, both of N.Y.

[73] Assignee: Texaco Inc., New York, N.Y.

[22] Filed: Dec. 29, 1972

[21] Appl. No.: 319,567

[52] U.S. Cl............. 252/51.5 A; 252/56 R; 252/59
[51] Int. Cl............................................ C10m 1/32
[58] Field of Search................ 252/51.5 A, 56 R, 59

[56] References Cited
UNITED STATES PATENTS

| | | | |
|---|---|---|---|
| 2,613,184 | 10/1952 | Catlin | 252/51.5 A |
| 2,892,785 | 6/1959 | Harle et al. | 252/51.5 A X |
| 3,251,906 | 5/1966 | Bauer | 252/51.5 A X |
| 3,277,056 | 10/1966 | Coleman | 252/51.5 A X |
| 3,304,260 | 2/1967 | Fields et al. | 252/51.5 A |
| 3,341,455 | 9/1967 | Coleman | 252/51.5 A |
| 3,509,056 | 4/1970 | Shepherd | 252/59 |
| 3,522,180 | 7/1970 | Sweeney et al. | 252/59 |

Primary Examiner—Delbert E. Gantz
Assistant Examiner—Andrew H. Metz
Attorney, Agent, or Firm—Thomas H. Whaley; Carl G. Ries; William E. McNulty

[57] ABSTRACT

Oil compositions comprising a lubricating oil, an amorphous ethylene-propylene copolymer viscosity index improver and a n-alkylmethacrylate-containing polymeric pour depressant are substantially haze free if the number average molecular weight of the pour depressant is below about 120,000.

7 Claims, No Drawings

METHOD OF PREVENTING HAZE IN OIL CONCENTRATES CONTAINING AN AMORPHOUS ETHYLENE-PROPYLENE COPOLYMER VISCOSITY INDEX IMPROVER

BACKGROUND OF THE INVENTION

This invention relates to lubricating oil compositions having improved viscosity index and pour depressant properties. In particular, this invention is directed to lubricating oil compositions containing polymeric additives which are compatible, in that they do not impart a haze to lubricating oil when admixed therewith to form additive concentrates and yet effectively improve the viscosity index and reduce the pour point of lubricating oil blends. This invention is especially directed to a combination of compatible lubricating oil additives, one of which is a shear stable viscosity index improver and the other a pour depressant additive.

The rate of change of viscosity of lubricating oil with temperature is called the viscosity index or V.I. Oils having a high viscosity index exhibit a smaller change in viscosity with temperature variation than those with a low viscosity index. In such applications as engine lubrication, where a wide range of temperature is often encountered, lubricating oils having high viscosity indices are highly desirable and often critically necessary. Long chain polymers and copolymers are often effective as viscosity improvers. These high molecular weight polymers are often subjected to high shear rates in lubricating service which can cause a viscosity loss and other undesirable effects in the oil blend. One V.I. improver additive which has proven effective as a viscosity improver while exhibiting a high degree of shear stability is an amorphous copolymer of ethylene and propylene described in U.S. Pat. No. 3,522,180. This copolymer has an amorphous structure, a number average molecular weight between 10,000 and 40,000, a propylene content of 20 to 70 mole percent and a polydispersity index ($\bar{M}_w/\bar{M}_n$) of less than about 5.

Since lubricating oils are often employed in low climates or exposed to low temperatures, it is advantageous to incorporate a pour depressant additive therein to maintain fluidity of the lubricant at low temperatures. While numerous pour depressants are known, many are unsatisfactory from the standpoint of high concentration of pour depressant required, high cost or inability of the pour depressant to lower the pour point to the required temperature level. Further, some pour depressants are found unacceptable since they are not compatible with other lubricating oil additives present in the oil such as those added to improve the viscosity index. This incompatibility may express itself in the form of haze in lubricating oil additive concentrates or even result in phase separation upon storage. An effective pour depressant is one which will substantially reduce the pour point of a treated oil when used in an economical small concentration without imparting any undersirable side effects to the lubricating composition.

It is an object of the invention to provide a lubricating oil composition containing an amorphous ethylene-propylene copolymer effective as a shear stable viscosity index improver and a polymeric additive effective as a pour depressant which will not impart haze to or produce phase separation in lubricating oil additive concentrates.

SUMMARY OF THE INVENTION

We have found that substantially haze-free blends of lubricating oil additive concentrates which impart improved viscosity index and lower pour point properties to lubricating oil blends can be prepared from a lubricating oil having blended therein an amorphous ethylenepropylene copolymer and a n-alkyl methacrylate-containing polymer having a number average molecular weight between about 30,000 and about 120,000. More particularly, we have found that lubricating oil containing an effective viscosity index improving amount of an amorphous ethylenepropylene copolymer having superior shear stability properties require additions of polymeric pour depressants to produce a product having a satisfactory low pour point. We have found that the pour point depressant polymer must have a number average molecular weight below about 120,000 to produce a haze-free additive concentrate and are prepared from a mixture of $C_4$–$C_{22}$, preferably $C_{12}$–$C_{18}$, n-alkylmethacrylates, alone or, optionally, copolymerized with either a dialkylaminoalkylmethacrylate or a N(alkanone) acrylamide. The preferred N-containing monomers are di-$C_1$–$C_6$ n-alkylamino $C_1$–$C_6$ n-alkylmethacrylate and N($C_4$–$C_{12}$-alkanone) acrylamide.

DESCRIPTION OF THE PREFERRED EMBODIMENTS

Broadly, we have found that haze-free lubricating oil additive concentrates containing a viscosity index improver of an amorphous ethylene-propylene copolymer and a pour depressant of a long chain n-alkyl methacrylatecontaining polymer will be produced if the number average molecular weight of the methacrylate-containing pour depressant is below about 120,000. These amorphous ethylenepropylene copolymers have a number average molecular weight between about 10,000 and 100,000, preferably between about 30,000 and 80,000, a propylene content of 20 to 70 mole percent and a $\bar{M}_w/\bar{M}_n$ of less than about 5. The pour depressant is prepared from monomers selected from the group consisting of (1) $C_4$–$C_{22}$ n-alkylmethacrylates and mixtures thereof, (2) a $C_4$–$C_{22}$ n-alkylmethacrylate, mixtures thereof and a dialkylaminoalkylmethacrylate and (3) a $C_4$–$C_{22}$ n-alkylmethacrylate, mixtures thereof, and a N(alkanone) acrylamide, said pour depressant having a number average molecular weight of about 30,000 to 120,000. We have found that higher molecular weight polymeric pour depressants will produce a haze in a lubricating oil additive concentrate when admixed with amorphous ethyleneproylene copolymers, such as those disclosed in U.S. Pat. No. 3,522,180. The haze produced is an indication that the additive combination is incompatible and in extreme conditions will produce phase separation following prolonged storage of the lubricating oil concentrate.

Our invention also relates to lubricating oil compositions prepared from these haze-free lubricating oil additive concentrates. These lubricating oil compositions have improved viscosity index and pour point properties and comprise a major portion of a lubricating oil, an effective pour point depressing amount of a polymeric pour depressant and an effective viscosity index improving amount of an ethylene-propylene copolymer having an amorphous structure, a number average molecular weight between about 10,000 and 100,000, preferably between about 30,000 and 80,000, a propylene content of 20 to 70 mole percent and a $\overline{M}_w/\overline{M}_n$ of less than about 5 wherein the polymeric pour depressant is an interpolymer prepared from monomers selected from the group consisting of (1) $C_4$–$C_{22}$ n-alkylmethacrylates and mixtures thereof, (2) a $C_4$–$C_{22}$ n-alkylmethacrylate, mixtures thereof, and a dialkylaminoalkylmethacrylate, and (3) a $C_4$–$C_{22}$ n-alkylmethacrylate, mixtures thereof and a N(alkanone) acrylamide, said interpolymer having a number average molecular weight of about 30,000 to 120,000. Preferably $C_{12}$–$C_{18}$ n-alkylmethacrylates are employed.

The lubricating oil base stocks which are employed in preparing the improved lubricating compositions of our invention are petroleum lubricating oils such as paraffin base, naphthene base, or mixed paraffin base distillate or residual oils. Broadly speaking a mineral lubricating oil having a viscosity at 100°F between about 50 and 1,000 may be used in preparing the improved lubricating compositions of our invention.

The concentration in which the amorphous ethylene-propylene copolymer is incorporated in the lubricating oil base stock will constitute a minor amount of the mixture, generally being from 0.5 to 5 wt. percent of the resultant blend. The exact quantity to be used will be dependent upon the viscosity level and extent of cross-grading desired, as well as the lubricating oil being utilized. To facilitate the introduction of the ethylene-propylene copolymer into the lubricating oil, it may be prepared as a concentrate with a solvent such as a light lubricating oil having a viscosity of between about 75 and 300 SUS at 100°F. to form an additive concentrate containing about 5 and 30 wt. percent copolymer.

Lubricating oil blends containing an effective viscosity index improving quantity of an amorphous ethylene propylene copolymer often require the addition of a polymeric pour depressant to produce a blend having a satisfactorily low pour point. The concentration in which the pour point depressant is incorporated in the lubricating oil blends of our invention are generally in the range of 0.05 to 10 wt. percent, preferably 0.1 to 1.0 wt. percent of the final blend. To facilitate the introduction of the polymeric pour depressant into the lubricating oil blend it may be diluted with a solvent such as a light lubricating oil having a viscosity of between about 75 and 300 SUS at 100°F. to form an additive concentrate containing between about 10 and 50 wt. percent of the pour depressant.

To facilitate the preparation of lubricating oil blends, a composite additive concentrate is prepared containing several or all of the additives required in the finished blend. However, if the additives are not compatible, the concentrate is hazy and if too incompatible, phase separation of the concentrate will result upon storage. Thus, as discussed hereinabove, we have found that an additive concentrate containing the amorphous ethylenepropylene copolymer and a polymeric pour depressant will not exhibit a haze if the number average molecular weight of the pour depressant is between 30,000 and 120,000. We have also found that in such additive packages, the weight ratio of ethylene-propylene copolymer to pour depressant is ideally between about 0.5:1 to 20:1 with a ratio of 10:1 usually meeting most requirements. In most instances, the concentration of the ethylene-propylene copolymer is 5 to 30 wt. percent, based on the solvent, and that of the pour depressant is 0.5 to 20 wt. percent, based on the solvent, in the composite additive concentrate. Those skilled in the art can appreciate that the ratio of the additives in the concentrate can be adjusted within broad ranges depending upon the particular conditions encountered and the performance desired.

The amorphous ethylene propylene copolymers which serve as viscosity index improvement additives in the lubricating composition of our invention may be prepared as described in U.S. Pat. No. 3,522,180 wherein the copolymers are prepared in a hydrogen-moderated reaction at moderate temperatures and pressures in the presence of a solvent soluble Ziegler-Natta catalyst. Gaseous mixtures of propylene and ethylene together with hydrogen are introduced into a reactor containing a solvent, which does not deactivate the catalyst, such as carbon tetrachloride, hexane, n-heptane, benzene or cyclohexane. Reaction temperatures between minus 40° and 250°F and a pressure of 0 to 300 psig are satisfactory. The two component Ziegler-Natta catalyst comprises a first component of a hydrocarbyl vanadate, a hydrocarboxy vanadyl halide or a vanadyltrihalide. The second catalyst component is an alkyl aluminum halide. Preferred catalyst systems include tri-n-butyl orthovandate as the first component and ethyl aluminum dichloride, diethylaluminum chloride or ethyl aluminum sesquichloride as the second component.

This Ziegler-Natta catalyst promoted, hydrogen moderated polymerization is used to produce ethylene-propylene copolymers having an amorphous structure, by infrared analysis, a number average molecular weight between about 10,000 and 100,000, and a narrow molecular weight distribution, measured by gel permeation chromatography (GPC), of less than about 5. Not only do these copolymers increase the viscosity index of lubricating when added thereto but they exhibit a substantially high resistance to the high shearing forces experienced in lubricating service which often mechanically degradate a long chain polymer.

The pour point depressant additives useful in the practice of this invention are the oil soluble interpolymers prepared from long chain n-alkyl-methacrylates, and, optionally and in addition thereto, either a dialkylaminoalkylmethacrylate or a N(alkanone) acrylamide wherein the interpolymer has a number average molecular weight below about 120,000. These interpolymers are prepared by the complete polymerization of an alkylmethacrylate monomer or mixtures thereof by conventional bulk, solution, or dispersion polymerization methods involving known polymerization catalysts, e.g., azo catalysts, such as azobisisobutronitrile of U.S. Pat. No. 2,471,959 or the well known peroxide catalysts such as benzoyl peroxide and lauryl peroxide, utilized in catalyst quantities of between about 0.1 and 5 wt. percent. Polymerization is normally conducted at a temperature between about 50° and 150°C., preferably at 80°–100°C., and usually carried out in an inert atmosphere such as nitrogen or carbon dioxide to prevent undesirable oxidation. During polymerization, samples are taken periodically for refractive index determination. The polymerization reaction is continued until the refractive index remains relatively steady with the normal reaction time taken between 1 and 10 hours.

The monomers utilized to prepare the useful pour depressants include n-alkylmethacrylates and optionally a dialkylaminoalkylmethacrylate or a N(alkanone) acrylamide. The n-alkylmethacrylate monomers are generally selected from those which contain from about 4 to about 22, preferably about 12 to about 18, carbon atoms in the aliphatic hydrocarbon chain. These methacrylates are prepared by standard esterification techniques through the reaction of methacrylic acid with technical grades of long chain primary alcohols. These commercially available alcohols are mixtures of n-alkanols of various chain lengths containing between about 4 and 22 carbons in the alkyl group. Several suitable sources of these alcohols mixtures are the technical grade alcohols sold under the tradename "Neodols" by Shell Chemical Corporation and under the tradename "Alfols" by Continental Oil Company. Typical analysis of two useful alcohols are set forth below:

|  | Typical Properties Approx. homolog distribution, wt. % |
|---|---|
| Neodol 25L (Synthetic Lauryl Alcohol) |  |
| lighter than $C_{12}OH$ | 4 |
| $C_{12}OH$ | 24 |
| $C_{13}OH$ | 24 |
| $C_{14}OH$ | 24 |
| $C_{15}OH$ | 15 |
| $C_{16}OH$ | 2 |
| Alfol 1620 SP (Synthetic stearyl alcohol) |  |
| $C_{14}OH$ and lighter | 4 |
| $C_{16}OH$ | 55 |
| $C_{18}OH$ | 27 |
| $C_{20}OH$ | 9 |

One of the nitrogen-containing monomers which may be incorporated into the interpolymeric pour depressants used in this invention is a dialkylaminoalkylmethacrylate. Preferably this is a di $C_1$–$C_6$ alkylamino $C_1$–$C_6$ alkylmethacrylate. Among these useful methacrylate monomers are diethylaminopropylmethacrylate, dimethylaminoethylmethacrylate, the propylaminoethylmethacrylates and the butylaminobutylmethacrylates. We find that dimethylaminoethylmethacrylate is particularly useful.

As an alternative to the nitrogen-containing methacrylate, we find that an acrylamide, in particular a N(alkanone) acrylamide may be employed. We find that N($C_4$–$C_{12}$ alkanone) acrylamides such as N(1,1-dimethylbutan-3-one) acrylamide and N(1,2-dimethyl-1-ethyl-butan-3-one) acrylamide are particularly useful. We find that incorporating a nitrogen-containing monomer into the interpolymer improves the dispersant characteristics of the oil blend.

The polymeric pour depressants which we find to be compatible with ethylene-propylene copolymer viscosity index improvers are those prepared from the monomers described above and which have a number average molecular weight between about 30,000 and about 120,000. We find that where the average molecular weight is maintained below about 120,000, the lubricating oil additive concentrate containing these two additives will be substantially haze free and there will be no phase separation during prolonged storage.

Our invention is illustrated in detail by the following examples.

EXAMPLE I

This example illustrates a method of preparing the amorphous ethylene-propylene copolymers utilized in the compositions of our invention.

About 500 milliliters of $CCl_4$ were saturated at 40°F. with a gaseous feedstock containing 6.8 mole percent hydrogen with the balance a mixture of ethylene and propylene in a mole ratio of propylene to ethylene of 1.3:1.0. A stirred reactor containing this solution was cooled with an ice bath while additional quantities of the above gaseous mixture were continuously introduced into the solution at a 1 liter per minute flow rate. One and onehalf millileter of a 20 weight percent solution of diethylaluminum chloride in heptane and one-half milliliter of a 20 weight percent solution of tri-n-butyl vanadate in heptane were then added. The polymerization started and the temperature rose from 40° to about 65°F. in about twenty minutes. At this point additional catalyst was added, one and one-half milliliters of the diethylaluminum chloride solution and one-half milliliter of tri-n-butyl vanadate solution. The reaction continued for an additional ten minutes until the reaction temperature declined to 50°F. The polymer was washed with dilute HCl and the solvent was removed by stripping to yield 23.3 grams of product.

The polymer was amorphous by infrared spectroscopy, had a number average molecular weight of 30,000, a molecular weight distribution, $\bar{M}_w/\bar{M}_n$, of below 4 and a propylene content of 44 mole percent as determined by nuclear magnetic resonance (NMR).

EXAMPLE II

This example shows a method of preparing an alkylmethacrylate copolymer useful in the lubricating compositions of our invention.

150 grams of a mixture of alkylmethacrylates consisting essentially of $C_{12}$–$C_{16}$ alkylmethacrylates (Alfol 1620 SP) and 50 grams of a mixture of alkylmethacrylates consisting essentially of $C_{16}$–$C_{20}$ alkylmethacrylates (Neodol 25 L) were combined with 100 grams of a hydrofined paraffin base oil having a viscosity of about 145 SUS at 100°F. and charged to a one liter resin kettle and purged with purified nitrogen for 40 minutes. The reaction mixture was then heated to 80°–83°C and 0.5 grams of azobisiosbutronitrile and 0.3 grams of dodecyl mercaptan were added and the polymerization allowed to proceed to completion over a period of four hours. The temperature was then raised to 100°C and held for one hour at this temperature at which point 300 grams of a hydrofined dewaxed paraffin base oil having a viscosity of about 100 SUS at 100°F. were added and the temperature held at 100°C for an additional hour.

The reactor contents consisted of an oil diluent having dissolved therein the alkyl methacrylate copolymer at a concentration of 33 wt. percent. This concentrate was employed in preparing lubrication oil blends for testing. This methacrylate copolymer, identified as pour depressant Sample A, had a number average molecular weight of between 30,000 and 120,000. A solvent refined paraffin base oil (Test oil No. 1) having an API gravity of 29.3°, viscosity of about 328 SUS/100°F. and about 53 SUS/210°F. exhibited a viscosity of 10.50 CS. at 210°F. when about 1.5 wt. percent of the copolymer was blended into it.

EXAMPLE III

In a fashion similar to that of Example II a number of other methacrylate copolymers were prepared for evaluation as compatible pour depressants. These polymers were prepared from the $C_{12}$–$C_{16}$ alkylmethacrylate and the $C_{16}$–$C_{20}$ alkylmethacrylate used in Example II plus another monomer which was either dimethylaminoethylmethacrylate or N(1,1 dimethylbutan-3-one) acrylamide. Table I below presents the monomer content of these polymers which are identified as pour depressant Samples B to I. All of these copolymers had a number average molecular weight between 30,000 and 120,000.

TABLE I

| POUR DEPRESSANT SAMPLE | B | C | D | E | F | G | H | I |
|---|---|---|---|---|---|---|---|---|
| Monomers, wt. % | | | | | | | | |
| DMAEMA[1] | 4 | — | — | 5 | — | 8 | 10 | — |
| DMBA[2] | — | 4 | 5 | — | 8 | — | — | 10 |
| $C_{12}$–$C_{16}$ AMA[3] | 71 | 71 | 70 | 70 | 67 | 67 | 70 | 70 |
| $C_{16}$–$C_{20}$ AMA[4] | 25 | 25 | 25 | 25 | 25 | 25 | 20 | 20 |

[1] Dimethylaminoethylmethacrylate
[2] N(1,1 dimethylbutan-3-one) acrylamide
[3] $C_{12}$–$C_{16}$ alkylmethacrylate (Neodol 25 L)
[4] $C_{16}$–$C_{20}$ alkylmethacrylate (Alfol 1620 SP)

EXAMPLE IV

The compatibility of a variety of pour depressants with an amorphous ethylene propylene copolymer viscosity index improver was evaluated by preparing a number of oil additive concentrates and subjecting them to a turbidity evaluation. The oil concentrates were prepared by adding a quantity of each of the pour depressant concentrates being tested to the ethylene-propylene concentrate of Example I to effect a concentration of ethylene propylene copolymer of about 15 wt. percent and a concentration of the pour depressant of about 1.5 wt. percent in the resultant concentrate. The evaluation included pour depressants Samples A-I as well as several commercial pour depressants, Samples J-L. Pour depressant Sample J is a higher molecular weight version of Sample A having a number average molecular weight of about 180,000. Test oil No. 1, containing about 1.5 wt. percent of Sample J, had a viscosity of 13.23 cs./210°F. Pour depressant Sample K is a polyalkylmethacrylate; the polymer has an intrinsic viscosity of 0.58 in benzene at 77°F. Pour depressant Sample L is a tetrapolymer of a lower alkylmethacrylate, two higher alkylmethacrylates and an alkylaminoalkylmethacrylate; the polymer has an intrinsic viscosity of 0.70–0.75 in benzene at 77°F. Test oil No. 1, containing about 1.5 wt. percent of Sample L, had a viscosity of 14.35 cs./210°F.

The compatibility of these additive concentrate packages was evaluated by measuring the light transmission of a sample of each of the formulations. The instrument utilized was a Lumetron model 402 E photoelectric colorimeter manufactured by The Photovolt Corp., 95 Madison Avenue, New York, N.Y. The results obtained are reported as a Lumetron turbidity percentage which is a measurement of the scattered light and is calculated by subtracting the percent transmission from 100. Only those blends demonstrating a turbidity less than 20% were found to be acceptable. Visual observation of the unacceptable blends showed them to be hazy.

The turbidity evaluations of these additive blends are shown in Table II below.

TABLE II

TURBIDITY OF ADDITIVE CONCENTRATE

| CONCENTRATE | LUMETRON TURBIDITY, % ACCEPTABLE = below 20% |
|---|---|
| E-P Copolymer Concentrate | 8 |
| plus 5% wt.% of pour depressant | |
| A | 19 |
| B | 18.5 |
| C | 12.5 |
| D | 14.5 |
| E | 11.5 |
| F | 14.5 |
| G | 12.5 |
| H | 13.4 |
| I | 19.1 |
| J | 25 |
| K | 26.5 |
| L | 47.5 |

EXAMPLE V

The additive blends of Example IV were then evaluated by blending them with a solvent neutral oil to produce in the final blend a pour depressant concentration of about 0.15 wt. percent and a VI additive concentration of about 1.5 wt. percent. Viscosity and pour point data of these blends are shown in Table III below:

TABLE III

VISCOSITY AND POUR POINT OF OIL BLENDS

| | Viscosity CS at 210°F | Pour Point °F |
|---|---|---|
| Base Oil[1] | 4.65 | 0 |
| Blends | | |
| Base oil plus | | |
| 1.5 wt. % E-P copolymer[2] | | |
| and 0.15 wt.% of | | |
| Pour Depressant | | |
| A | 11.48 | −35 |
| B | 11.54 | −35 |
| C | 10.58 | −30 |
| D | 10.47 | −40 |
| E | 10.72 | −35 |
| F | 10.60 | −35 |
| G | 10.39 | −35 |
| H | 10.58 | −35 |
| I | 10.58 | −40 |
| J | 11.42 | −35 |
| K | 11.46 | −35 |
| L | 12.07 | −25 |

[1] Base oil is a solvent neutral refined oil.
[2] E-P copolymer is an amorphous ethylene-propylene copolymer containing about 45 mole % propylene, having a $\overline{M}_n$ of 30,000 and a $M_w/M_n$ of less than 5.

The above examples show that all of the pour depressants were effective in reducing the pour point to an acceptable level. However, additive concentrates of Samples J, K and L were not compatible with the ethylene propylene copolymer and failed to pass the turbidity evaluation while concentrates containing the ethylene-propylene copolymer and pour depressant Samples A-I, prepared according to our invention, were substantially haze-free.

We claim:

1. A process of preventing haze in an oil additive concentrate comprising (a) a hydrocarbon solvent, (b) 0.5 to 20 wt. percent, based on solvent, of a polymeric pour depressant prepared from monomers selected from the group consisting of (1) $C_4$–$C_{22}$ n-alkyl methacrylates and mixtures thereof, (2) a $C_4$–$C_{22}$ n-alkyl methacrylate, mixtures thereof, and a dialkylaminoalkylmethacrylate and (3) a $C_4$–$C_{22}$ n-alkyl methacrylate, mixtures thereof and a N(alkanone) acrylamide and (c) 5 to 30 wt. percent, based on solvent, of an ethylene-propylene copolymer having an amorphous structure, a number average molecular weight between about 10,000 and 100,000, a propylene content of 20 to 70 mole percent and a $\bar{M}_w/\bar{M}_n$ of less than about 5 which comprises admixing the hydrocarbon solvent and the ethylene-propylene copolymer with the polymeric pour depressant, the polymeric pour depressant having a number average molecular weight of about 30,000 to 120,000.

2. A process according to claim 1 wherein the monomers are $C_{12}$–$C_{18}$ n-alkylmethacrylates and mixtures thereof.

3. A process according to claim 1, wherein the dialkylaminoalkylmethacrylate is a di-$C_1$–$C_6$ alkylamino $C_1$–$C_6$ alkylmethacrylate.

4. A process according to claim 1 wherein the dialkylaminoalkylmethacrylate is dimethylaminoethylmethacrylate.

5. A process according to claim 1 wherein the acrylamide is N($C_4$–$C_{12}$ alkanone) acrylamide.

6. A process according to claim 1 wherein the acrylamide is N(1,1 dimethylbutan-3-one) acrylamide.

7. A process according to claim 1 wherein the ethylene-propylene copolymer has a number average molecular weight between about 30,000 and 80,000.

* * * * *